(12) United States Patent
Krishnamurthy

(10) Patent No.: US 8,894,940 B2
(45) Date of Patent: Nov. 25, 2014

(54) PROCESS AND APPARATUS FOR DISTRIBUTING HYDROCARBON FEED AND CATALYST

(75) Inventor: Sujay R. Krishnamurthy, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 237 days.

(21) Appl. No.: 13/523,273

(22) Filed: Jun. 14, 2012

(65) Prior Publication Data

US 2013/0336851 A1 Dec. 19, 2013

(51) Int. Cl.
*B01J 8/18* (2006.01)
*C10G 11/14* (2006.01)

(52) U.S. Cl.
USPC ............ 422/143; 422/213; 422/214; 422/220

(58) Field of Classification Search
CPC .......... B01J 8/44; B01J 8/1818; B01J 8/1845; B01J 2208/00769; B01J 2208/00752
USPC .................. 422/143, 213, 214, 220
See application file for complete search history.

(56) References Cited

U.S. PATENT DOCUMENTS

| | | | |
|---|---|---|---|
| 2,471,085 A * | 5/1949 | Wilcox et al. | 208/156 |
| 4,297,321 A * | 10/1981 | Beranek | 422/143 |
| 4,948,568 A | 8/1990 | Chessmore et al. | |
| 2011/0282124 A1 | 11/2011 | Palmas et al. | |
| 2013/0334101 A1 | 12/2013 | Krishnamurthy | |

FOREIGN PATENT DOCUMENTS

| | | |
|---|---|---|
| CN | 1191322 C | 3/2005 |
| CN | 202099253 U | 3/2005 |

OTHER PUBLICATIONS

Anderson, "Improved FCCU feed and catalyst contact", Asia Pacific Refining Technology Conference (Singapore Apr. 20-22, 1998) (Adaptation) Petroleum Technology Quarterly (ISSN 1362-363) V4 N. 1 55-59 (Spring 1999), Mar. 1999; Conference: Asia Pacific Refining Technology Conference; Author affiliation: Saudi Aramco.

Johnston, "Effect of Distributor Designs on the Flow Development in Downer Reactor", AIChE Journal (ISSN 0001-1541) V45 N.7 1587-92 (Jul. 1999), v 45, n 7 p. 1587-1592, Jul. 1999; ISSN: 0011541; Publisher: John Wiley and Sons.

\* cited by examiner

*Primary Examiner* — Lessanework Seifu
(74) *Attorney, Agent, or Firm* — James C Paschall

(57) ABSTRACT

A process and apparatus for fluid catalytic cracking feeds catalyst to a chamber of a riser. The catalyst exits the chamber and passes through a plenum and into a reaction zone through a plurality of tubes which distribute the catalyst uniformly over a cross section of the reaction zone of the riser. A hydrocarbon feed is fed to the plenum. The hydrocarbon feed passes from the plenum into the reaction zone through a plate comprising a multiplicity of openings which distribute the hydrocarbon feed uniformly over a cross section of the reaction zone of the riser. The feed is contacted with the catalyst in a reaction zone of the riser.

12 Claims, 3 Drawing Sheets

US 8,894,940 B2

PROCESS AND APPARATUS FOR DISTRIBUTING HYDROCARBON FEED AND CATALYST

BACKGROUND OF THE INVENTION

The invention relates to a process and apparatus for feeding hydrocarbon feed to be contacted with catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

FCC can create a variety of products from heavier hydrocarbons. Often, a feed of heavier hydrocarbons, such as vacuum gas oil, is provided to an FCC reactor. Various products may be produced, including a gasoline product and/or light olefins, such as at least one of propylene and ethylene. To produce more light olefins, product cuts from FCC effluent, such as naphtha, may be recycled to the riser reactor or to an additional riser reactor for additional catalytic cracking. These product cuts may be fed to the riser in a gaseous phase. Feed distributed to the riser in liquid phase is typically vaporized upon injection into the riser.

A problem encountered during the FCC process is distributing the feed in the riser so that it can adequately mix with the catalyst. Adequate mixing is usually necessary for efficient conversion of the feed. Hydrocarbon feed distributors spray dispersion steam and hydrocarbon feed into the riser typically transversely to a flowing stream of catalyst that is propelled upwardly by a fluidizing, lift gas. A relationship between injected feed velocity, drop size and momentum limits the horizontal travel of the injected hydrocarbon feed against the lift gas and catalyst accelerating vertically, upwardly in the riser. Additionally, a dense core of catalyst may develop in the axial center of the riser that resists penetration by the vaporous hydrocarbon feed. Larger riser diameters may exacerbate this problem because of the inherent difficulty in distributing the feedstock further toward the center of the riser.

Recycled feeds such as lighter hydrocarbon feeds derived from fluid catalytic cracked products may be recycled or fed to a reactor riser in vaporous phase. Penetration of vaporous feed into a flowing stream of catalyst is also difficult because of the lower density of the vaporous feed.

It may be desirable to provide a distributor for distributing hydrocarbon feed and catalyst to an FCC reactor from the same location.

SUMMARY OF THE INVENTION

This invention relates generally to an improved FCC process and apparatus. Specifically, this invention may relate to an improved feed and catalyst distributor and may be useful for FCC operation to distribute feed and catalyst into a reactor riser.

In a process embodiment, the present invention is a process for fluid catalytic cracking comprising passing catalyst to a reaction zone of a riser through a plate. Hydrocarbon feed is fed to the reaction zone of a riser through the plate. Lastly, the feed is contacted with the catalyst in the reaction zone of the riser.

In an additional process embodiment, the present invention is process for fluid catalytic cracking comprising passing hydrocarbon feed upwardly in a riser from a multiplicity of first openings spread out uniformly over a cross section of the riser. Catalyst is passed upwardly in the riser from a plurality of second openings spread out uniformly over a cross section of the riser. Lastly, the catalyst and the hydrocarbon feed are contacted in the riser.

In a further process embodiment, the present invention is process for fluid catalytic cracking comprising feeding catalyst to a chamber of a riser. The catalyst exits the chamber and passes through a plenum and into a reaction zone through a plurality of tubes which distribute the catalyst uniformly over a cross section of the reaction zone of the riser. Hydrocarbon feed is fed to the plenum. The hydrocarbon feed is passed from the plenum into the reaction zone through a plate comprising a multiplicity of openings which distribute the hydrocarbon feed uniformly over a cross section of the reaction zone of the riser. Lastly, the feed is contacted with the catalyst in a reaction zone of the riser.

In an apparatus embodiment, the present invention is apparatus for fluid catalytic cracking comprising a riser and a reaction zone in the riser. A plate defines the reaction zone with a first opening in the plate for passing hydrocarbon feed to the reaction zone and a second opening in the plate for passing catalyst to the reaction zone.

In an additional apparatus embodiment, the present invention is an apparatus for fluid catalytic cracking comprising a riser and a chamber including an upper barrier. A plurality of openings is in communication with the chamber. The openings are spaced uniformly over the cross section of the riser. A plenum including a plate with a multiplicity of openings spread out uniformly over a cross section of the riser. Lastly, a reaction zone in the riser is in communication with the chamber and the plenum through the plurality of openings and the multiplicity of openings.

In a further apparatus embodiment, the present invention is an apparatus for fluid catalytic cracking comprising a riser and a reaction zone in the riser. The apparatus also comprises a fluidizing gas distributor and a catalyst inlet. A chamber is in communication with the catalyst inlet and the fluidizing gas distributor. A plenum is in communication with a feed inlet. Lastly, a tube communicates the chamber with the reaction zone and an opening in the plenum communicates the plenum with the reaction zone.

The catalyst and feed distributor evenly distributes the hydrocarbon stream and catalyst over the cross section of the riser from the same location to provide better contact as the catalyst and feed flow concurrently upwardly in the riser.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

DETAILED DESCRIPTION OF THE INVENTION

The present invention is an apparatus and process for feeding a hydrocarbon feed and a catalyst stream to a riser to effect contact. Conventionally, hydrocarbon feed is injected from a side of the riser transversely to upwardly flowing catalyst, requiring the catalyst momentum to sweep the feed in an upward direction to contact the catalyst. The present invention is designed to deliver hydrocarbon feed and catalyst into a reaction zone of the riser from the same location to travel in the same direction, thereby enhancing contact between the two.

In an aspect, the hydrocarbon feed is in vapor phase. The hydrocarbon feed may be the only hydrocarbon feed fed to the riser or in an addition to another hydrocarbon feed fed to the riser. If an additional feed is fed to the riser, the feed may be a recycled feed derived from riser effluent. Accordingly, the hydrocarbon feed may be a conventional FCC feed or a light hydrocarbon stream. The feed and catalyst are fed to a lower end of a riser in which regenerated catalyst and carbonized catalyst may be mixed for contact with the hydrocarbon feed. The illustrated embodiment, however, only shows feeding regenerated catalyst to the riser.

The present invention may be useful in any solids-gas contacting equipment. However, ready usefulness is found in an FCC unit.

Figure 1:
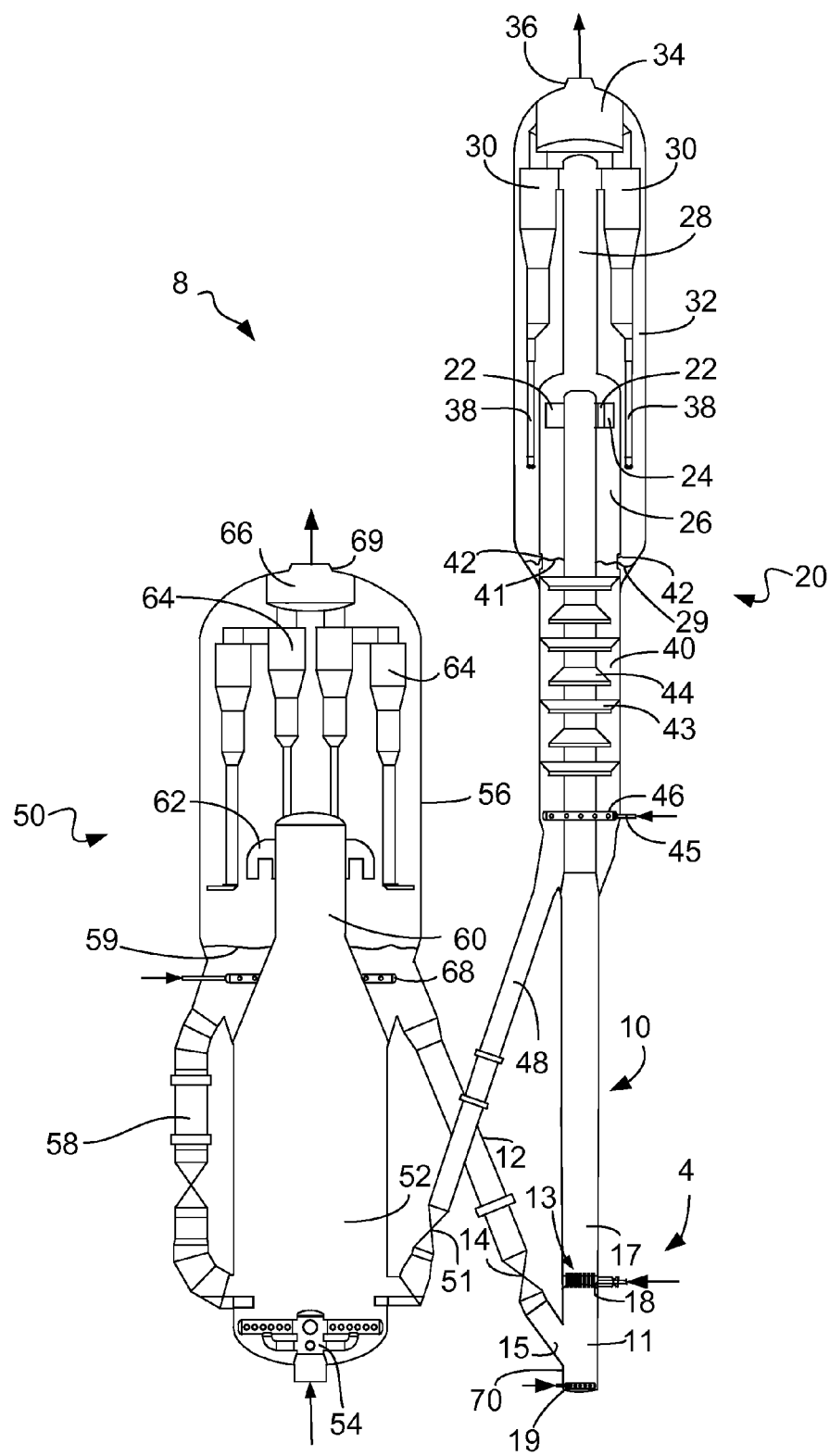
FIG. 1 is a schematic, elevational view of an FCC unit incorporating the present invention.

FIG. 1 shows an FCC unit 8 having a catalyst and feed distributor 4. The FCC unit 8 includes a reactor vessel 20 and a regenerator vessel 50. A regenerated catalyst conduit 12 transfers a regenerated catalyst stream from the regenerator vessel 50 at a rate regulated by a control valve 14 through a regenerated catalyst inlet 15 of the regenerated catalyst conduit 12 to the reactor riser 10. The regenerated catalyst inlet 15 is in communication with the riser 10. An optional carbonized catalyst conduit may transfer a second carbonized catalyst stream from the reactor vessel 20 to the reactor riser 10, but this embodiment is not shown.

The riser 10 is an elongated vertical tube typically made of killed carbon steel. The inner surface of the entire riser 10 may be coated with a refractory material. A feed inlet 18 may deliver feed to the riser to be contacted with catalyst. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable primary hydrocarbon feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention may also include mixtures of the above hydrocarbons and the foregoing list is not comprehensive.

It is also contemplated that lighter recycle or previously cracked feeds such as naphtha may be a suitable secondary or the only hydrocarbon feedstock to the riser. A light naphtha fraction suitable as the only feed or a secondary feed to the riser may have an initial boiling point (IBP) below about 127° C. (260° F.) in the $C_5$ range; i.e., about 35° C. (95° F.), and an end point (EP) at a temperature greater than or equal to about 127° C. (260° F.). The boiling points for these fractions are determined using the procedure known as ASTM D86-82. A heavy naphtha fraction suitable as the only feed or a secondary feed to the riser may have an IBP at or above about 127° C. (260° F.) and an EP at a temperature above about 200° C. (392° F.), preferably between about 204° and about 221° C. (400° and 430° F.). A full range naphtha fraction suitable as the only feed or a secondary feed to the riser may have an initial boiling point (IBP) below about 127° C. (260° F.) in the $C_5$ range; i.e., about 35° C. (95° F.) and an EP at a temperature above about 200° C. (392° F.), preferably between about 204° and about 221° C. (400° and 430° F.).

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit.

A transport conduit 28 carries the hydrocarbon vapors, including stripped hydrocarbons, stripping media and entrained catalyst to one or more cyclones 30 in the reactor vessel 20 which separates carbonized catalyst from the product hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped, carbonized catalyst leaves the stripping section 40 of the disengaging vessel 26 of the reactor vessel 20 with a lower concentration of entrained or adsorbed hydrocarbons than it had when it entered or if it had not been subjected to stripping. The carbonized catalyst may leave the disengaging vessel 26 of the reactor vessel 20 through a spent catalyst conduit 48 and feed into the regenerator vessel 50 at a rate regulated by a control valve 51. An optional second portion of the carbonized catalyst that has been coked in the reactor riser 10 may leave the disengaging vessel 26 of the reactor vessel 20 and be fed back to the riser 10, but this embodiment is not shown.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (gauge) (10 to 75 psig) but typically less than about 275 kPa (gauge) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator for completely regenerating carbonized catalyst. However, other regenerator vessels and other flow conditions may be suitable for the present invention. The spent catalyst conduit 48 feeds carbonized catalyst to a lower chamber 52. The carbonized catalyst from the reactor vessel 20 usually contains carbon in an amount of from 0.2 to 2 wt-%, which is present in the form of coke. An oxygen-containing combustion gas, typically air, enters the lower chamber 52 of the regenerator vessel 50 and is distributed by a distributor 54. As the combustion gas enters the lower chamber 52, it contacts carbonized catalyst entering from spent catalyst conduit 48 and lifts the catalyst 52. The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 52, hot regenerated catalyst from a dense catalyst bed 59 in an upper chamber 56 may be recirculated into the lower chamber 52 via an external recycle catalyst conduit 58. Mixing hot catalyst from the dense catalyst bed 59 with relatively cooler carbonized catalyst from the spent catalyst conduit 48 entering the lower chamber 52 raises the overall temperature of the catalyst and gas mixture in the lower chamber 52. The mixture of catalyst and combustion gas in the lower chamber 52 ascends through a frustoconical transition section to the transport, riser section 60 of the lower chamber 52.

The regenerator vessel 50 also includes an upper chamber 56. The mixture of catalyst particles and flue gas is discharged from an upper portion of the riser section 60 into the upper chamber 56. Substantially completely regenerated catalyst may exit the top of the transport, riser section 60, but arrangements in which partially regenerated catalyst exits from the lower chamber 52 are also contemplated. Discharge is effected through a disengaging device 62 that separates a majority of the regenerated catalyst from the flue gas. Cyclones 64 further separate catalyst from ascending gas and deposits catalyst through dip legs into dense catalyst bed 59. Flue gas exits the cyclones 64 and collects in a plenum 66 for passage to an outlet nozzle 69 of regenerator vessel 50 and perhaps into a flue gas or power recovery system (not shown). A fluidizing conduit delivers fluidizing gas, typically air, to the dense catalyst bed 59 through a fluidizing distributor 68, so the catalyst will fluidly exit through the catalyst conduits 58 and 12.

The regenerator vessel 50 typically has a temperature of about 594 to about 732° C. (1100 to 1350° F.) in the lower chamber 52 and about 649 to about 760° C. (1200 to 1400° F.) in the upper chamber 56. The regenerated catalyst conduit 12 is in downstream communication with the regenerator vessel 50 and communicates with the riser 10. Regenerated catalyst from dense catalyst bed 59 is transported through regenerated catalyst conduit 12 from the regenerator vessel 50 back to the reactor riser 10 through the control valve 14 and catalyst inlet 15 where it again contacts feed as the FCC process continues.

The riser 10 may comprise a lower chamber 11 and an upper reaction zone 17 in the riser. The portion of the riser defining the upper reaction zone 17 may be made of chrome steel. The lower chamber 11 may include a hemispherical bottom. The catalyst and feed distributor 4 may be provided at the interface between the lower chamber 11 and the upper reaction zone. In an embodiment, the regenerated catalyst conduit 12 may connect to the lower chamber 11 at a wall 70 of the lower section at the inlet 15. A fluidizing gas distributor 19 may be located in the lower chamber 11 to emit fluidization medium such as steam to urge catalyst upwardly through the lower chamber 11 at a relatively high density. In this embodiment, the lower chamber 11 is in downstream communication with the catalyst inlet 15 and the fluidizing gas distributor 19.

An intermediate plenum 13 is provided between lower chamber 11 and the reaction zone 17. In an embodiment, one or a plurality of feed inlets 18 to the plenum 13 may provide hydrocarbon feed to the plenum which is in downstream communication with the feed inlet 18. If the hydrocarbon feed is vaporous before injection, a single feed inlet may be sufficient. If the hydrocarbon feed is liquid before injection, a plurality of feed inlets 18 may be necessary. The feed inlets 18 may comprise feed distributors that inject hydrocarbon feed along with an atomizing fluid such as steam in a manner that makes the hydrocarbon feed readily susceptible to vaporization. The atomizing fluid assists in the generation of small droplets of hydrocarbon feed upon injection, so that the liquid feed can readily vaporize upon injection. Also, the small droplet size allows for easier distribution of feed across the cross section of the riser.

Figure 2:
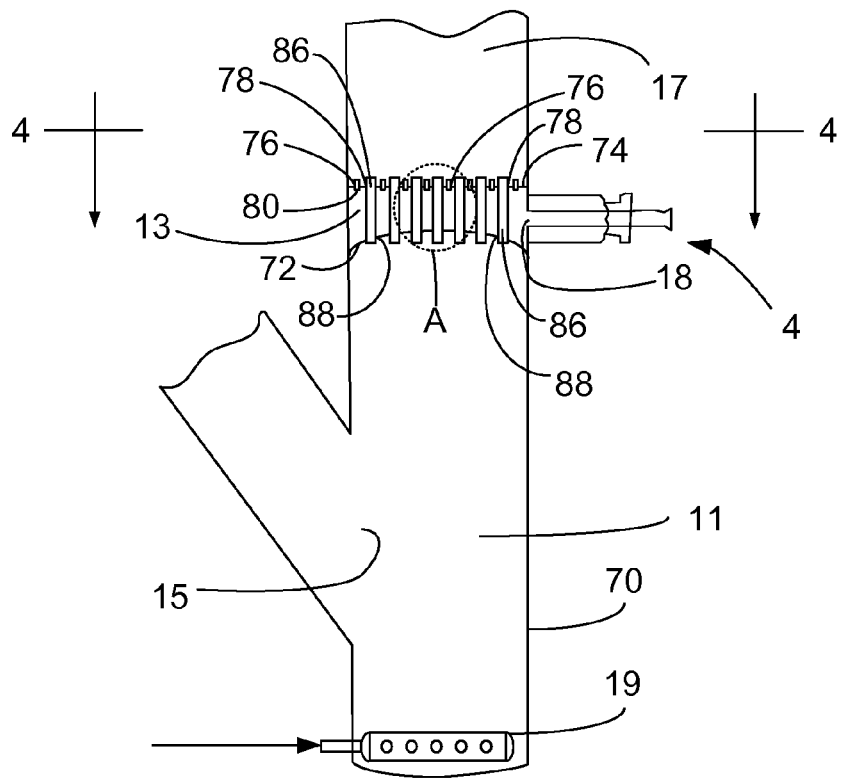
FIG. 2 is an enlarged, partial elevational view of a portion of FIG. 1.

FIG. 2 is a partial elevational view of FIG. 1 showing the catalyst and feed distributor 4. The lower chamber 11 has a barrier 72 at its upper end. The barrier 72 and a plate 74 define the intermediate plenum 13 with the wall of the riser 70. The plate 74 also defines a lower end of the reaction zone 17. The plate 74 has a first opening 76 and a second opening 78. The plate 74 may be flat or curved but in an aspect may not include a corner that defines an acute angle except perhaps along the margins of the plate. In an embodiment, the first opening 76 in the plate 74 is for passing hydrocarbon feed from the plenum 13 into the reaction zone 17. Consequently, the plenum 13 is in downstream communication with the feed inlet 18. The plenum 13 communicates with the reaction zone 17 through the first opening 76, so the reaction zone 17 is in downstream communication with the plenum. The first opening 76 is in downstream communication with the plenum 13.

In a further aspect, the plate 74 may be equipped with a nozzle 80 to provide the opening 76 for passing hydrocarbon feed to the reaction zone 17. In an aspect, the plate 74 has a multiplicity of first openings 76 which include the first opening 76. In a still further aspect, the plate 74 may be a perforated plate with a multiplicity of first openings 76 for passing hydrocarbon feed from the plenum 13 into the reaction zone 17. In an even further aspect, the plate 74 may be equipped with a multiplicity of nozzles 80 that provide a multiplicity of first openings 76 for passing hydrocarbon feed from the plenum 13 into the reaction zone 17. A first opening 76 can be provided in the nozzle 80 which is in downstream communication with the plenum 13 if the plate is equipped with a nozzle 80.

Figure 3:
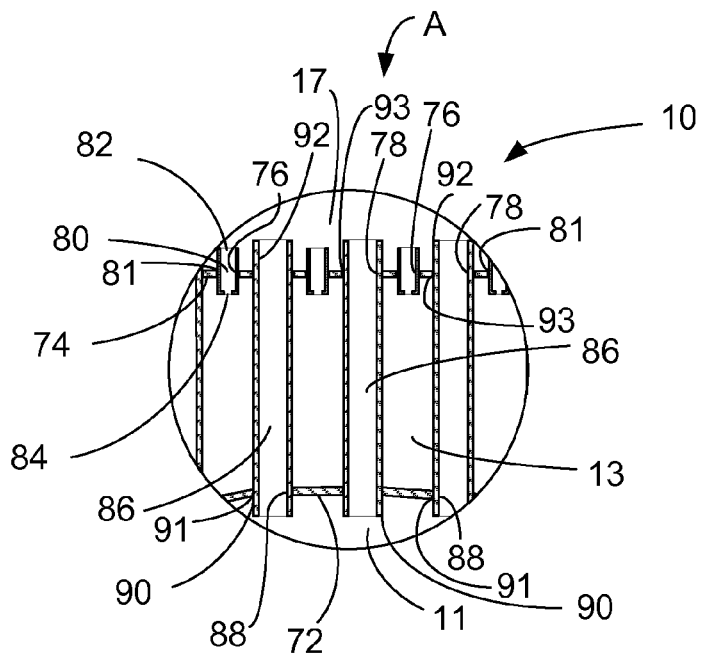
FIG. 3 is a further enlarged, partial elevational view of section A of FIG. 2.

In a further embodiment, shown in FIG. 3, is a further enlarged, partial elevational view of section A of FIG. 2. The plate 74 may be equipped with a nozzle 80 in an aperture 81 to provide the first opening 76 in the plate 74. In an aspect, the plate 74 may be equipped with a multiplicity of nozzles 80 in a multiplicity of respective apertures 81 in the plate to provide the multiplicity of first openings 76 in the plate 74. The nozzles may have two different inner diameters at respective ends. A dual-diameter nozzle 80 provides a means to independently set the jet outlet velocity into the reaction zone 17 and the pressure drop across the plate 74 to properly distribute vaporous hydrocarbon feed across the cross-section of the riser 10. The jet outlet velocity of the feed is adjusted by the area of the outlet opening 82 in the nozzle 80 located in the reaction zone 17 while the pressure drop is set by the area of the inlet opening 84 in the nozzle 80 located in the plenum 13. The multiplicity of first openings 76 are in downstream communication with the plenum 13 in an aspect through the nozzle or nozzles 80.

Turning back to FIG. 2, in this embodiment, the second opening 78 in the plate 74 is for passing catalyst from the lower chamber 11 to the reaction zone 17. The second opening 78 is in downstream communication with the lower chamber 11. The plate 74 is equipped with a tube 86 to provide the second opening 78 for communicating the lower chamber 11 with the reaction zone 17 through the second opening 78. In an aspect, the tube 86 extends from the barrier 72 to provide an opening 88 in the barrier 72 to the plate 74 to provide the second opening 78 in the plate. In a further aspect, the tube 86 extends through the barrier 72 to provide the opening 88 in the barrier and through the plate 74 to provide the second opening 78 in the plate. A second opening 78 can be considered provided in the tube 86 which may be in downstream communication with the lower chamber 11. The second opening 78 may be in downstream communication with the lower chamber 11 via the tube 86. It is sufficient, that the tube 86 communicate the lower chamber 11 with the reaction zone 17 without communicating with the plenum 13. Consequently, the reaction zone 17 is in downstream communication with the lower chamber 11 through the second opening 78, tube 86 and the opening 88, but the plenum 13 is not in communication with the lower chamber 11 through the tube 86.

FIG. 3 also shows the tube 86 extending between the opening 88 in the barrier 72 and the second opening 78 in the plate 74. The tube 86 extends through the plenum 13 to provide communication between the reaction zone 17 and the lower chamber 11.

The tube 86 has a first end 90 that may extend from or through an aperture 91 in the barrier 72 to provide the opening 88 in the barrier. The tube 86 extends through the plenum 13. The tube 86 has a second end 92 that may extend to or through the aperture 93 in the plate 74 to provide the second opening 78 in the plate 74 to provide communication between the reaction zone 17 and the lower chamber 11.

In an aspect, the barrier 72 may have a plurality of openings 88 which includes the opening 88 for passing catalyst from the lower chamber 11 into the reaction zone 17. In a further aspect, the barrier may be equipped with a plurality of tubes 86 in a plurality of respective apertures 91 that provide the plurality of openings 88 proximate the first end 90 for passing hydrocarbon feed from the lower chamber 11 into the reaction zone 17. In a further aspect, the plate 74 may have a plurality of second openings 78 which include the second opening 78 for passing catalyst from the lower chamber 11 to the reaction zone 17. In this aspect, the plate 74 may be equipped with the plurality of tubes 86 in a plurality of respective apertures 93 that provide the plurality of second openings 78 proximate the second end 92 for passing hydrocarbon feed from the lower chamber 11 into the reaction zone 17.

In this aspect, a plurality of tubes 86 may communicate the lower chamber 11 with the reaction zone 17. Consequently, the plurality of tubes 86 may have first ends 90 that extend from or through the barrier 72 to provide the plurality of openings 88 in the barrier. The tubes 86 extend through the plenum 13 and to or through the plate 74 at their second ends 92 to provide the plurality of second openings 78 in the plate 74. The plurality of second openings 78 are in downstream communication with the lower chamber 11 in an aspect through the respective tubes 86.

Figure 4:
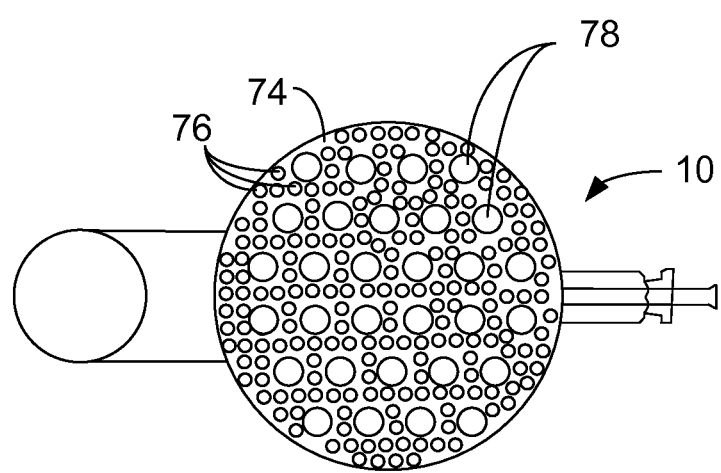
FIG. 4 is a sectional view of FIG. 2 taken at segment 4-4.

FIG. 4 is a sectional view taken from segment 4-4 of FIG. 2. The multiplicity of first openings 76 and the plurality of second openings 78 are spaced uniformly over the cross section of the plate 74. In this embodiment, the uniformly spaced first openings 76 and second openings 78 are spaced uniformly over the cross section of the riser 10 to distribute hydrocarbon feed and catalyst evenly over the cross section of the riser. The distributor 4 distributes catalyst and hydrocarbon feed evenly together over the cross section of the riser to provide more intimate contact in the riser 10 as they flow concurrently from the same location.

With respect to all of the FIGS., in a first embodiment, a process for fluid catalytic cracking using the catalyst and feed distributor 4 comprises feeding hydrocarbon feed to the plenum 13 through a feed inlet 18 which may be a feed distributor especially when the feed is in liquid phase prior to injection into the plenum. The hydrocarbon may vaporize in the plenum 13 if it is not already in vapor phase. Hydrocarbon feed is passed from the plenum 13 into the reaction zone 17 through a first opening 76 in the plate 74. Hydrocarbon feed may pass from the plenum 13 into the reaction zone 17 through a first opening or a multiplicity of first openings 76 in the plate 74 which distribute the hydrocarbon feed uniformly over a cross section of the reaction zone 17 of the riser 10. The hydrocarbon feed may pass through a nozzle 80 providing the first opening 76 or a multiplicity of nozzles 80 providing the first openings 76 or the multiplicity of first openings 76 in the plate 74 into the reaction zone 10, respectively.

In this embodiment, catalyst is fed to the lower chamber 11 of the riser 10 from the regenerated catalyst conduit 12 through catalyst inlet 15. The catalyst is propelled upwardly in the lower chamber 11 by fluidizing gas from fluidizing gas distributor 19 in the riser 10. The barrier 72 limits upward movement of the catalyst except through opening 88 or openings 88 in the barrier. Catalyst exits from the lower chamber 11 through an opening 88, or in an aspect through a tube 86 providing the opening 88. Catalyst may travel upwardly from a lower end 90 of the tube 86, through the plenum 13, through second opening 78 in the plate 74, to an upper end 92 of the tube 86 from which it passes into the reaction zone 17. The catalyst passes through the plate 74 as it exits the plenum 13. In an aspect, the catalyst exits the lower chamber 11 through a plurality of openings 88, passes through the plenum 13 and through the plurality of second openings 78 in the plate 74 and into the reaction zone 17 through the plurality of tubes 86. The plurality of tubes 86 are arrayed uniformly over the cross section of the riser 10 to distribute the catalyst uniformly over a cross section of the reaction zone 17 of the riser. While the catalyst passes through the plenum 13, the tubes 86 isolate the catalyst from the hydrocarbon feed until they both enter the reaction zone 17. The catalyst and the hydrocarbon feed both pass upwardly through the plate 74 into the reaction zone 17. The hydrocarbon feed then contacts with the catalyst in a reaction zone 17 of the riser 10 in a manner well distributed over the cross section of the riser 10.

In an additional embodiment, it is contemplated that in the catalyst and feed distributor 4, catalyst may be passed to the plenum 13 and distributed through a first opening 76 or a multiplicity of first openings 76 into the reaction zone 17 and hydrocarbon feed may be fed to the lower chamber 11 and passed through a tube 86 or tubes 86 through a second opening 78 or a plurality of second openings 78 into the reaction zone 17 to be contacted with catalyst therein. The catalyst would be isolated from the feed as the feed passes through the plenum 13. Revisions such as sizing would have to be made to the embodiments in the FIGS. and the plenum 13 would have to be in downstream communication with the catalyst inlet 15 and the lower chamber 11 would have to be in downstream communication with the feed inlet 18. Other changes would be apparent from the teachings herein.

The FIGS. depict the invention without showing refractory. However, it is anticipated that one and/or both sides of the barrier 72, the plate 74, all nozzles 80, all tubes 86, and the interior of the riser would be coated with a layer of refractory that is not shown.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for fluid catalytic cracking comprising:
   a riser;
   a reaction zone in said riser;
   an inner surface of said riser coated with a refractory material;
   a plate defining said reaction zone;
   a first opening in said plate for passing hydrocarbon feed to said reaction zone;
   a second opening in said plate for passing catalyst to said reaction zone;
   a fluidizing gas distributor;
   a catalyst inlet;
   a chamber in communication with said catalyst inlet and said fluidizing gas distributor;
   a feed inlet;
   a plenum in communication with said feed inlet and located between said chamber and said reaction zone;
   said plenum communicating with said reaction zone through said first opening; and
   a tube for communicating said chamber with said reaction zone through said second opening.

2. The apparatus of claim 1 wherein said chamber has a barrier through which said tube extends.

3. The apparatus of claim 2 wherein said tube extends through said plenum.

4. The apparatus of claim 2 wherein said plate defines said plenum and said plate has a multiplicity of openings which include said first opening.

5. The apparatus of claim 1 wherein said plenum is defined by said barrier and said plate.

6. The apparatus of claim 1 further comprising a plurality of tubes communicating said chamber with said reaction zone and said plurality of tubes provide a plurality of openings including said second opening and said tubes are spaced uniformly over the cross section of the riser.

7. The apparatus of claim 1 wherein said plate defines the lower end of said reaction zone.

8. An apparatus for fluid catalytic cracking comprising:
   a riser;
   an inner surface of said riser coated with a refractory material;
   a chamber including an upper barrier;
   a plurality of openings in communication with said chamber, said openings spaced uniformly over the cross section of the riser;
   a plenum including a plate with a multiplicity of openings spread out uniformly over a cross section of said riser;
   a reaction zone in said riser in communication with said chamber and said plenum through said plurality of openings and said multiplicity of openings; and
   a plurality of tubes extending through said plenum to communicate said chamber with said reaction zone through said upper barrier; wherein said plenum is disposed between said chamber and said reaction zone.

9. The apparatus of claim 8 wherein said plenum is defined by said upper barrier and said plate.

10. An apparatus for fluid catalytic cracking comprising:
    a riser;
    an inner surface of said riser coated with a refractory material;
    a reaction zone in said riser;

a fluidizing gas distributor;

a catalyst inlet;

a chamber in communication with said catalyst inlet and said fluidizing gas distributor;

a plenum comprising a perforated plate in communication with a feed inlet;

said chamber having a barrier from which a tube extends for communicating said chamber with said reaction zone; and said perforated plate including an opening in said plenum for communicating said plenum with said reaction zone, said plenum being defined by said barrier and said perforated plate.

11. The apparatus of claim 10 wherein said tube extends through said plenum.

12. The apparatus of claim 10 further comprising a plurality of tubes communicating said chamber with said reaction zone and said plurality of tubes are spaced uniformly over the cross section of the riser.

* * * * *